United States Patent [19]

Keini et al.

[11] 3,912,052
[45] Oct. 14, 1975

[54] DECELERATION SENSOR FOR ANTI-SKID VEHICLE BRAKES

[76] Inventors: David Keini, Shikma St. 4, Haifa, Israel, 34737; David W. Pessen, Kadima St. 33, Haifa, Israel, 34383

[22] Filed: Oct. 30, 1974

[21] Appl. No.: 519,075

[52] U.S. Cl. ............................ 188/181 A; 303/21 B
[51] Int. Cl.² ............................................ B60T 8/16
[58] Field of Search .................. 188/181 A, 181 R; 200/61.46; 303/21 CG, 21 CF, 21 A, 21 B; 324/160–162

[56] References Cited
UNITED STATES PATENTS 3,414,335    12/1968    DeCastelet ..................... 303/21 CG
3,851,928    12/1974    Pagdin ........................... 303/21 CG

*Primary Examiner*—Duane A. Reger

[57] ABSTRACT

A sensor which directly senses the ratio between wheel and vehicle deceleration, containing a shaft rotating at a velocity proportional to the angular velocity of the vehicle wheel, and a flywheel connected to this shaft by spring means which permit both relative rotation and relative axial motion between flywheel and shaft, with a fixed ratio between the rotation and axial motion. When vehicle brakes are applied, the flywheel moves axially depending on the ratio between wheel and vehicle deceleration, and this motion can be utilized to actuate an anti-skid brake system.

9 Claims, 5 Drawing Figures

3,912,052

DECELERATION SENSOR FOR ANTI-SKID VEHICLE BRAKES

BACKGROUND OF THE INVENTION

The present invention relates to deceleration sensors used in conjunction with anti-skid vehicle brake systems. It is a well-known fact that the optimum braking torque is that which causes the wheel speed to be about 10 to 15 percent less than the vehicle speed. This is referred to as 10 to 15 percent "slippage". If the slippage exceeds the above value considerably, the vehicle is liable to skid, producing a dangerous situation where the driver is liable to lose control of the vehicle. On the other hand, if the slippage is less than 10 percent, the full capability of the braking system is not being utilized.

A great number of anti-skid brake systems have been invented which automatically release the brake pressure whenever the slippage reaches a predetermined dangerous value. Such systems alternately release and reapply the brake pressure at a relatively high frequency (from 10 to 50 times a second). Such systems were originally developed for aircraft landing gears, but government regulations will soon require use of such systems in buses and trucks, and even in private automobiles. Complicated systems, whose high expense is justified in connection with aircraft brakes, are obviously not suitable for private automobiles. It therefore becomes essential to develop simple and inexpensive, yet highly reliable anti-skid systems for automobile brakes.

Most of the systems developed so far make use of a magnetic sensor mounted on or near the brakes which generates a.c. voltage pulses at a rate proportional to wheel speed. These pulses are fed to an electronic circuit which calculates the wheel deceleration. A second sensor measures the vehicle deceleration. The electronic circuit calculates the ratio of wheel deceleration to vehicle deceleration, and, if this ratio is too large, sends a control signal to the brake system which temporarily releases the brake pressure. The use of separate sensors to measure wheel and vehicle deceleration obviously increases the complexity and cost of the system, and requires the use of electronic circuits to compare the sensor signals.

SUMMARY OF THE INVENTION

An object of the present invention is to produce a mechanical sensor which directly an inherently senses the ratio between wheel and vehicle deceleration, without the need for any additional electronic computation.

A further object of the present invention is to produce a sensor of the above type which is extremely simple and rugged, and inexpensive to manufacture.

A further object of the present invention is to produce a sensor of the above type which automatically compensates for the slope of the road on which the vehicle is driven.

Further objects appear in the specification, drawings, and claims.

BRIEF DESCRIPTION OF THE DRAWINGS

In the drawings, we have chosen to illustrate three embodiments of the invention, choosing the forms shown from the standpoint of convenience in illustration, satisfactory operation, and clear demonstration of the principles involved.

DESCRIPTION OF THE PREFERRED EMBODIMENTS

Figure 1:
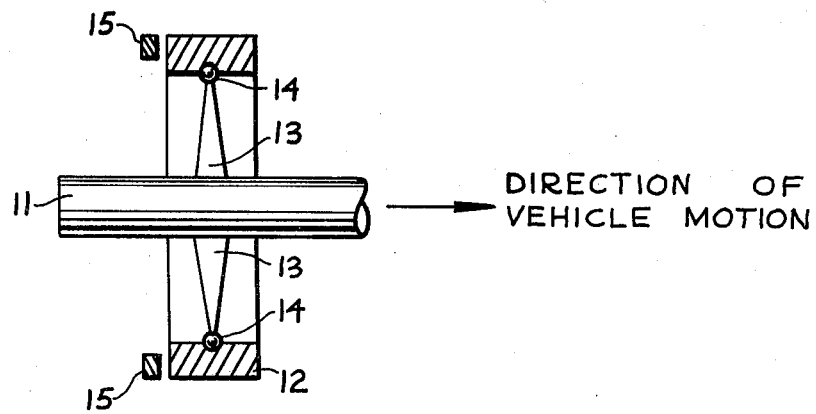
FIG. 1 is a cross-section view showing one embodiment of the invention.

FIG. 1 shows one preferred embodiment of the sensor. Shaft 11 is connected by a suitable mechanical transmission (e.g., by gearing or flexible shaft) to the driven train of the vehicle, so that shaft 11 turns at a speed proportional to the rotational speed of the vehicle wheels. In the case of sophisticated anti-skid brake systems, the shaft 11 could be connected to one specific wheel only, with each wheel having its own deceleration sensor. The shaft 11 is mounted on the vehicle so that its axis is aligned substantially in the direction of vehicle motion.

Figure 2:
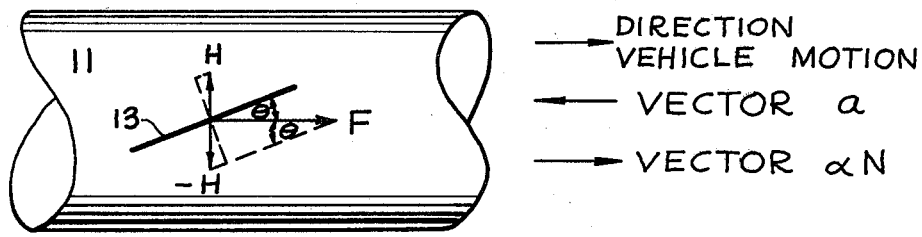
FIG. 2 shows a portion of FIG. 1 to an enlarged scale, together with force vectors to aid in the explanation of the invention.

An annular-shaped flywheel 12 is attached concentrically to shaft 11 by means of three or more tapered leaf springs 13. These leaf springs are rigidly attached at their base to shaft 11, at equal angular intervals along the circumference of the shaft. The base of each leaf spring 13 is inclined to the axis of shaft 11 at an angle $\theta$, as illustrated in FIG. 2. A typical value of $\theta$ might be 30°, though other angles could also be used. The outer end of each leaf spring terminates in a small ball 14 which sits in a spherical indentation of flywheel 12. Each leaf spring 13 is able to bend readily only in a direction perpendicular to its plane. As a result, a given amount of bending of each leaf spring will result in a defined deflection component in the axial direction, and likewise in a defined deflection component in the circumferential direction, with the ratio of these two components equal to the tangent of the angle $\theta$.

When the brakes are applied, the vehicle wheel experiences an angular deceleration $\alpha$, and the vehicle itself experiences a lineal deceleration $a$. If there is no skidding or slippage of the wheels, then $$a = r\alpha \tag{1}$$

where $r$ is the wheel radius. On the other hand, if there is some wheel slippage (due to excessive braking pressure, or due too smooth a road surface), the above relation will not be satisfied, and $a$ will be less than $r\alpha$. Assuming that the optimum braking conditions occur at about 15 percent slippage, we wish to obtain $$a = 0.85\, r\alpha \tag{2}$$

The angular wheel deceleration $\alpha$ is transmitted to the shaft 11 and flywheel 12, and produces an angular shaft deceleration equal to $\alpha N$, where N is the speed ratio between shaft and wheel. Assuming that the shaft deceleration acts in the direction indicated by the arrow $\alpha N$ in FIG. 2 (using the well-known right-hand rule for vectors representing rotation), this deceleration will produce an inertia torque on the flywheel tending to bend the leaf springs, and this will deflect the flywheel slightly towards the left due to the angle $\theta$. On the other hand, the vehicle deceleration $a$ (acting towards the left) produces an inertia force on the flywheel tending to deflect the flywheel slightly to the right. The sensor must be designed so that these two deflections will cancel each other when Equation (2) is satisfied. If, on the other hand, the slippage exceeds 15 percent, the deflection to the left caused by $\alpha N$ will exceed the deflection to the right caused by $a$. As a result, the flywheel moves to the left, and this movement can be utilized to close electrical contact 15.

Summarizing, the sensor senses directly both the angular wheel deceleration and the vehicle deceleration, and compares the two. Whenever their ratio exceeds a certain value, an electrical signal is produced, which can be used to actuate a solenoid valve and momentarily interrupt the braking pressure. As a result, the slippage will again decrease, the sensor returns to its normal position, and the braking pressure is reinstated. The above cycle repeats itself several times a second. Appropriate hydraulic circuits for accomplishing this braking action are well known, and are not part of the present invention which relates only to the deceleration sensor itself.

The design equations for the sensor will now be derived. FIG. 2 shows the vector F, which represents the flywheel inertia force produced by the vehicle deceleration $a$. This force acts in the direction of the sensor shaft. The figure also shows vector H, which represents the flywheel tangential inertia force produced by the angular deceleration $\alpha N$. In order for the flywheel to remain stationary with respect to the sensor shaft, the components of H and F perpendicular to the leaf spring must be equal and opposite to each other. From the figure, we see that this requires $$\tan \theta = \frac{H}{F} \qquad (3)$$

Applying Newton's law of motion to the flywheel, we have $$F = \frac{M}{n} a \qquad (4)$$

where M is the flywheel mass, and n is the number of leaf springs connecting the flywheel to the shaft. Likewise, $$H r_i = \frac{I}{n} \cdot \alpha N \qquad (5)$$

where $r_i$ is the inner flywheel radius, and I is the flywheel moment of inertia given by $$I = \frac{M}{2} (r_o^2 - r_i^2) \qquad (6)$$

where $r_o$ is the outer flywheel radius.

Substituting Equations (4) and (5) into (3) gives $$\frac{M}{n} a \tan \theta = \frac{I \alpha N}{r_i n} \qquad (7)$$

Cancelling n and substituting Equations (2) and (6) into (7) gives $$0.85 \, r \alpha m \tan \theta = \frac{M}{2} (r_o^2 - r_i^2) \frac{\alpha N}{r_i}$$

Cancelling $\alpha M$ and rearranging gives $$r_o^2 = r_i^2 + \left( \frac{1.7 r \tan \theta}{N} \right) r_i \qquad (8)$$

Equation (8) defines the proper design of the flywheel, and indicates that the necessary outer radius $r_o$ does not depend on the width or the mass of the flywheel. In other words, the inner and outer flywheel radii must be chosen so as to satisfy Equation (8) for proper sensor performance, whereas the flywheel width and mass are not critical.

Figure 3:
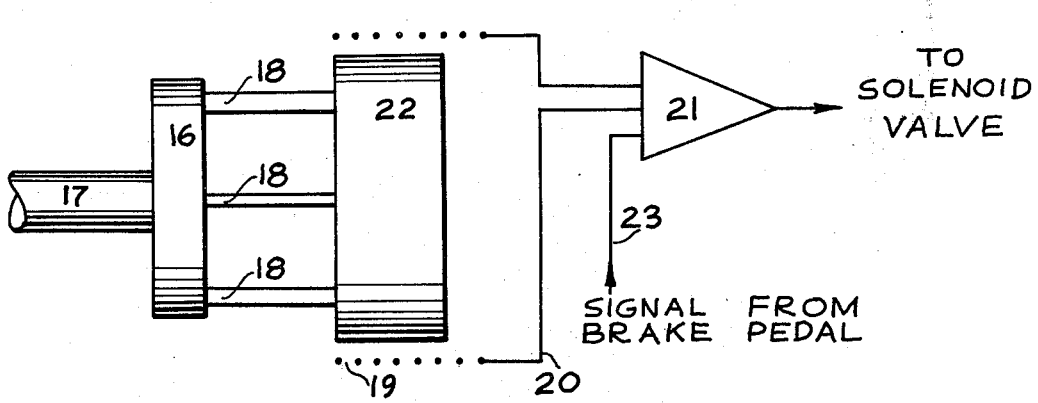
FIG. 3 is a front-view showing a second embodiment of the invention.

FIG. 3 shows a second embodiment of the invention. Here the flywheel 22 is connected to an end plate 16 of shaft 17 by means of three or more leaf springs 18 which are parallel to shaft 17. Angular shaft deceleration will produce a torsional deflection of the flywheel and leaf springs, causing the leaf springs to bend and the flywheel to move to the left, whereas vehicle deceleration will tend to defect the flywheel to the right. Both first and second embodiments operate according to the same basic principles.

FIG. 3 also illustrates a different way of utilizing the flywheel motion. Instead of closing electrical contacts, the flywheel 22 moves inside a coil 19 thereby inducing an electrical voltage in lines 20. This voltage is amplified by an electronic amplifier 21 which in turn operates a solenoid valve in the hydraulic brake system. Using this type of electronic sensing has the following advantages as compared to the use of electrical contacts:

a. Absence of physical contact with the flywheel, thus eliminating contact wear and making for greater reliability.

b. Possibility of easily producing damping of flywheel motion (to counteract the effect of car vibration), by means of eddy currents or by induced e.m.f. in backing coils with suitable resistance.

c. Possibility of using a floating amplifier null point to cancel the undesirable effect of gravity on the flywheel null position while the vehicle is travelling on a steep grade. For example, the amplifier null point could be automatically reset every time the brake pedal is applied, using the voltage sent from the brake pedal to the brake lights as reset signal, as indicated by wire 23.

It will be evident to those skilled in the art that various methods could be employed to sense the flywheel motion electrically. In one possible method, the coil could be part of the secondary coil of a differential transformer, where the flywheel would be the armature carrying a primary coil with a constant current. Any relative motion between flywheel and secondary coil induces a proportional voltage in the secondary coil. In a second possible method, the flywheel motion varies the reluctance of the coil 19, and this change in reluctance is electronically amplified and utilized to operate the solenoid valve. These methods are not part of the present invention and, since they are well known, will not be further discussed here.

Figure 4:
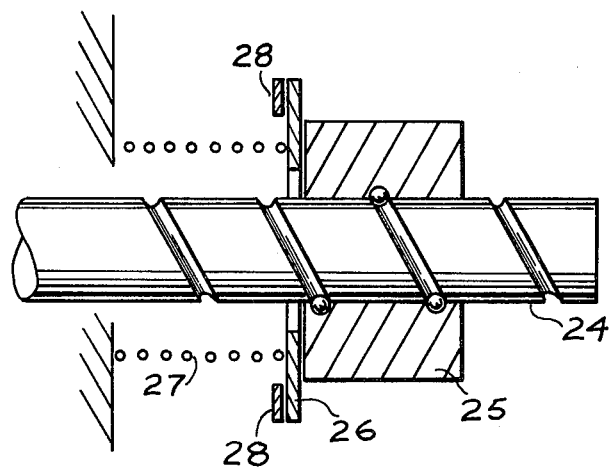
FIG. 4 is a cross-section view showing a third embodiment of the invention.

FIG. 4 shows a third embodiment of the invention. Here, the sensor shaft 24 consists of a ball screw, and the flywheel 25 comprises the nut for the ball screw. Here also, there is a fixed geometrical relationship between rotation and axial motion of the flywheel depending on the pitch of the ball screw, and the operation of the sensor is based on the same principles as that of the other embodiments. As the flywheel moves to the left, it presses against a slip disk 26. Axial motion of this disk 26 against spring 27 closes electrical contacts 28. The spring is used to return the flywheel 25 to its neutral position after the brake pressure has been released.

It should be obvious that each one of the three sensor embodiments shown in FIGS. 1, 3 and 4 respectively can be used in conjunction with electrical contacts as illustrated in FIGS. 1 and 4, or alternatively to induce a voltage change in a coil as illustrated in FIG. 3.

Figure 5:
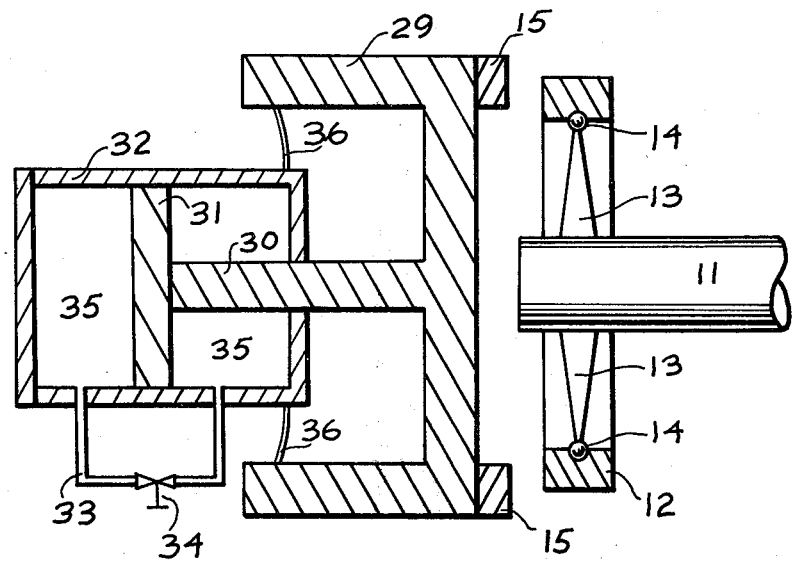
FIG. 5 is a cross-section view showing the first embodiment of the invention together with a device which compensates for the slope of the road.

FIG. 5 shows the sensor according to the embodiment of FIG. 1 together with hydraulic means for compensating the effect of road grade. Shaft 11, flywheel 12, leaf springs 13, balls 14 and electrical contacts 15 are identical with the respective elements in FIG. 1. Howwever, in FIG. 5 the electrical contacts 15 are not fixed but are mounted on the extension 29 of piston rod 30 driving piston 31 inside cylinder 32. Tubing 33 with needle valve or fixed restriction 34 connects the hydraulic fluid 35 contained on both sides of the piston 31. The device acts as a hydraulic dashpot, and generates a resisting damping force proportional to the velocity of piston motion. The extension 29 is connected to cylinder 32 by means of three or more leaf springs 36 having an axial-motion spring constant calculated so that the ratio of mass to spring constant is substantially the same for the mass of parts 29, 30, 31 and springs 36 on one hand, as for the flywheel 12 and springs 13 on the other hand.

If the vehicle travels on a steep grade, the flywheel 12 will suffer an axial deflection due to gravity, and this would ordinarily change the steady-state distance between flywheel and electrical contacts and would thus introduce an error in the operation of the sensor. However, if the spring constant of spring 36 is properly chosen as described above, the extension 29 will have an identical axial deflection as flywheel 12 because of the grade, so that the proper steady-state distance between flywheel and electrical contacts is maintained, regardless of road grade. On the other hand, sudden vehicle deceleration produced by braking does not produce any immediate motion of piston 31 because of the damping action of the dashpot, so that the distance between flywheel and electrical contacts will be reduced, as described in connection with FIG. 1.

In cases where a coil is used instead of electrical contacts, as illustrated in FIG. 3, it would usually be simpler to compensate for road grade by resetting the amplifier null point when the brake pedal is actuated, as described above.

The advantages of the invention will now be understood: The sensor, in any one of its three preferred embodiments, consists of a minimum of parts, which by virtue of their mechanical design, inherently sense the ratio between wheel and vehicle deceleration. Because of its simplicity, the sensor is simple to manufacture and reliable in operation.

It is to be understood that the forms of the invention here described are to be taken as preferred embodiments. Various changes may be made in the arrangement of parts, and equivalent elements may be substituted for those described, all without departing from the spirit or scope of the invention as defined in the subjoined claims.

Having thus described my invention, I claim:

1. A deceleration sensor for anti-skid vehicle brakes comprising:
   a. a shaft rotating at a velocity proportional to the angular velocity of the vehicle wheel;
   b. a rotating mass;
   c. resilient means connecting said rotating mass to said shaft so as to permit both relative rotation and relative axial motion between said rotating mass and shaft, and adapted to produce a fixed relationship between said relative rotation and relative axial motion;

said deceleration sensor being mounted in the vehicle at an orientation such that vehicle deceleration produces a relative axial motion between said rotating mass and shaft in a direction opposite to that caused by wheel deceleration.

2. A deceleration sensor for anti-skid vehicle brakes according to claim 1, wherein said rotating mass is annular shaped and encircles said shaft substantially concentrically, and wherein said resilient means comprises a plurality of leaf springs extending substantially radially from the shaft, with the outer end of each leaf spring attached to the rotating mass, while the inner end of each leaf spring is attached to the shaft with an angular displacement with respect to a plane normal to the shaft axis.

3. A deceleration sensor for anti-skid vehicle brakes according to claim 2, herein said rotating mass has an outer radius $r_o$ and an inner radius $r_i$, and wherein said rotating mass is proportioned so as to substantially satisfy the relationship $$r_o^2 = r_i^2 + (\frac{K \cdot \tan \theta}{N}) r_i$$

where $r$ is the vehicle wheel radius, N is the speed ratio between said shaft and vehicle wheel, $\theta$ is the said angular displacement between said leaf springs and a plane normal to the axis of said shaft, and K is a constant equal to a value greater than 1.5 but less than 19.

4. A deceleration sensor for anti-skid vehicle brakes according to claim 1, wherein said rotating mass is located substantially concentrically with respect to said shaft, and wherein said resilient means comprises a plurality of leaf springs substantially parallel to the shaft axis.

5. A deceleration sensor for anti-skid vehicle brakes according to claim 1, further comprising electric detecting means adapted to detect the axial motion of said rotating mass.

6. A deceleration sensor for anti-skid vehicle brakes according to claim 5, wherein said electric detecting means comprises a pair of electric contacts adapted to be closed whenever said axial motion of the rotating mass exceeds a predetermined value.

7. A deceleration sensor for anti-skid vehicle brakes according to claim 6, wherein one of said pair of electric contacts is mounted on said rotating mass, and further comprising:

a. a non-rotating mass adapted to move axially in a direction parallel to said shaft in response to vehicle decelelration, and supporting the other of said pair of electrical contacts;
b. spring means constraining the motion of said non-rotating mass;
c. and damping means opposing the motion of said non-rotating mass with a damping force substantially proportional to the velocity of motion.

8. A deceleration sensor for anti-skid vehicle brakes according to claim 5, wherein said electric detecting means comprise a coil surrounding said rotating mass adapted to generate a change in electric voltage depending on the relative motion of the rotating mass.

9. A deceleration sensor for anti-skid vehicle brakes according to claim 8, further comprising an electronic amplifier adapted to amplify said generated voltage change; and means for applying a voltage signal to said amplifier whenever the vehicle brake pedal is applied.

* * * * *